United States Patent
Gordon et al.

(10) Patent No.: US 10,995,015 B2
(45) Date of Patent: May 4, 2021

(54) SYSTEM AND METHOD FOR PURIFICATION OF DRINKING WATER, ETHANOL AND ALCOHOL BEVERAGES OF IMPURITIES

(71) Applicant: Cavitation Technologies, Inc., Chatsworth, CA (US)

(72) Inventors: Roman Gordon, Studio City, CA (US); Igor Gorodnitsky, Marina del Rey, CA (US); Maxim A. Promtov, Tambov (RU); Naum Voloshin, Los Angeles, CA (US)

(73) Assignee: Cavitation Technologies, Inc., Chatsworth (CA)

( * ) Notice: Subject to any disclaimer, the term of this patent is extended or adjusted under 35 U.S.C. 154(b) by 74 days.

(21) Appl. No.: 16/286,309

(22) Filed: Feb. 26, 2019

(65) Prior Publication Data
US 2019/0194586 A1 Jun. 27, 2019

Related U.S. Application Data

(63) Continuation-in-part of application No. 15/796,570, filed on Oct. 27, 2017.

(51) Int. Cl.
*C02F 1/34* (2006.01)
*B01F 5/10* (2006.01)
(Continued)

(52) U.S. Cl.
CPC ...... *C02F 1/34* (2013.01); *A23L 2/74* (2013.01); *B01D 29/009* (2013.01);
(Continued)

(58) Field of Classification Search
CPC .. C02F 1/34; C02F 2303/04; C02F 2201/002; B01F 5/10; B01F 5/0644; B01F 5/0615; C12H 1/16; C12H 1/063; A23L 2/74
See application file for complete search history.

(56) References Cited

U.S. PATENT DOCUMENTS 3,268,122 A * 8/1966 Berman ................ F04B 9/115
222/246
3,402,570 A 9/1968 Schlichtig
(Continued)

FOREIGN PATENT DOCUMENTS

RU 02316481 C2 2/2008
RU 02368657 C1 9/2009
WO 2005042178 A1 5/2005

OTHER PUBLICATIONS

Arrojo, S. et al., A Parametrical study of disinfection with hydrodynamic cavitation, ScienceDirect, Ultrasonics Sonochemistry (2008), 15: 903-908.
(Continued)

*Primary Examiner* — Liam Royce
(74) *Attorney, Agent, or Firm* — Kelly & Kelley, LLP

(57) ABSTRACT

A system and method for the purification of beverage fluids, primarily alcohol beverages, based on the action of hydrodynamic cavitation processing of microbiological and chemical contaminants, micro particles and colloidal particles. The system is a batch system with a single vessel having an extraction tube and discharge tube extending into the same reservoir of fluid. Fluid is drawn through the extraction tube and forced through the discharge tube. The discharge tube contains cavitation elements dispersed along its length to generate hydrodynamic cavitation in the fluid as it is pumped through. The discharge fluid is mixed with the fluid already in the vessel and is re-drawn through the extraction tube in continuous batch processing.

10 Claims, 13 Drawing Sheets

(51) Int. Cl.
*B01F 5/06* (2006.01)
*C12H 1/16* (2006.01)
*A23L 2/74* (2006.01)
*B01D 29/00* (2006.01)
*C12H 1/07* (2006.01)
*B01D 65/08* (2006.01)

(52) U.S. Cl.
CPC .......... *B01F 5/0615* (2013.01); *B01F 5/0644* (2013.01); *B01F 5/10* (2013.01); *C12H 1/063* (2013.01); *C12H 1/16* (2013.01); *B01D 65/08* (2013.01); *C02F 2201/002* (2013.01); *C02F 2303/04* (2013.01)

(56) References Cited

U.S. PATENT DOCUMENTS

| | | | |
|---|---|---|---|
| 5,326,468 | A | 7/1994 | Cox |
| 5,393,417 | A | 2/1995 | Cox |
| 6,402,361 | B1 * | 6/2002 | Reinemuth ......... B01F 3/04539 366/136 |
| 9,403,697 | B2 | 8/2016 | McGuire |
| 2006/0081541 | A1 | 4/2006 | Kozyuk |
| 2007/0102371 | A1 | 5/2007 | Bhalchandra et al. |
| 2010/0104705 | A1 | 4/2010 | Gordon et al. |
| 2010/0308083 | A1 | 12/2010 | Taylor |
| 2013/0330454 | A1 | 12/2013 | Mahamuni |
| 2016/0289619 | A1 | 10/2016 | Mancosky |

OTHER PUBLICATIONS

Didenko, Y.T. et al., Hot Spot Conditions During Cavitation in Water, J. Am. Chem. Soc. (1999) 121: 5817-5818.
Gogate, P.R., Application of cavitational reactors for water disinfection: Current status and path forward, Elsevier, Journal of Environmental Management (2007) 85: 801-815.
Gogate, P.R., Cavitational reactors for process intensification of chemical processing applications: A critical review, ScienceDirect, Chemical Engineering and Processing (2008) 47: 515-527.
Kumar, J.K. et al., Cavitation—A New Horizon in Water Disinfection, VDM Verlag, (Dec. 24, 2010).
Mahulikar, A.V. et al., Steam Bubble Cavitation, University Institute of Chemical Technology, Wiley Interscience, AIChE Journal (2008) 54: 1711-1724.
Milly, P.J. et al., Inactivation of Food Spoilage Microorganisms by Hydrodynamic Cavitation to Achieve Pasteurization and Sterilization of Fluid Foods, Journal of Food Science, Food Microbiology and Safety (Nov. 9, 2007) 72: 414-422.
Suslick, K.S., The Chemical Effects of Ultrasound, Scientific American (1989) 260: 80-86.
Suslick, K.S. et al., Acoustic cavitation and its chemical consequences, The Royal Society London A (1999) 357: 335-353.
Young, F.R., Cavitation, London, U.K.: Imperial College Press, 418 pp.
Zhang, X.D. et al., The Collapse Intensity of Cavities and the Concentration of Free Hydroxyl Radical Released in Cavitation Flow, ScienceDirect, Chinese Journal of Chemical Engineering (2008) 16: 547-551.

* cited by examiner

SYSTEM AND METHOD FOR PURIFICATION OF DRINKING WATER, ETHANOL AND ALCOHOL BEVERAGES OF IMPURITIES

RELATED APPLICATION

This application is a continuation-in-part of U.S. application Ser. No. 15/796,570, filed Oct. 27, 2017.

BACKGROUND OF THE INVENTION

The invention relates to a system and method for use the food industry, in particular, devices that increase the organoleptic characteristics of beverages, namely alcoholic beverages, i.e., solutions of alcohol and alcoholic beverages—vodka, whiskey, rum, brandy, wine, etc. The inventive system and method also has application in the purification of drinking water and finds numerous applications in alcohol production, food industries and at home. Removable contaminants include micro particles, colloidal particles, microbiological and chemical impurities whose concentration can be decreased to the allowable levels in one pass through the present apparatus. The proposed method generates changes in the fluidic flow's velocity, pressure, temperature, chemical composition and physical properties in order to reduce the concentration of impurities.

In the production of drinking water, ethanol and alcohol beverages, their components (water, ethanol, etc.) are purified by various technologies. Water is typically treated with a reagent method (coagulation, lime-soda), ion exchange resins (Na-cation exchange, cation and anion exchange resins), an adsorption method (using activated carbon), a redox method (de-ironing, ozonization), or membrane filtration (ultrafiltration, reverse osmosis). Ethanol may be purified by multiple distillation, or chemical treatment with various reagents and filtration.

In clarification of wine, hydrophilic colloids (casein, egg white, gelatin, fish glue and others) may be introduced to interact with wine colloids. Insoluble compounds resulting from the interaction of protein and tannin substances form flakes, which, settling on the bottom, carry with them the fine particles suspended in the wine, and make it lighter. Clarification of wine is usually carried out in two stages: agglomeration of particles (coagulation) and precipitation of a solid phase (sedimentation).

After the preparation of alcohol beverages according to a certain recipe, they are filtered to retain the fine particles formed during the purification process. To remove impurities, which give alcohol beverages an unpleasant odor and taste, they are treated with activated carbon. After treatment with activated carbon, alcohol beverages are filtered to remove the smallest particles of coal.

Even after purification in an industrial plant, ethanol and some alcohol beverages, made from ethanol, have low flavor qualities and a sharp odor. This is a consequence of the presence in ethanol of chemical impurities, which impair the organoleptic quality of alcohol beverages.

Alcohol beverages can contain such impurities as Acetaldehyde and/or Acetal, Benzene, Methanol, Fusel Oils (as Isobutyl, Isoamyl and active Amyl), Non Volatile Matter, Heavy Metals and others.

Physical-chemical characteristics of wines are characterized by the content of ethanol, sugars, acids, polyphenols and other components. The number and combination of these substances depend on the organoleptic characteristics of wines. To improve the organoleptic properties of alcohol beverages and drinking water it is necessary to use purification methods and devices, which the consumer can use to improve their quality. The ordinary consumer should be given an opportunity to improve the taste of alcohol beverages to the required quality and purify drinking water. This will be possible if consumers are able to purchase and use simple and reliable home devices for treatment of alcohol beverages and drinking water to improve their organoleptic properties and remove impurities.

Methods of finishing treatment of alcohol beverages through filters of different designs such as flexible membrane and rigid porous septum are quite widespread. The methods of finishing treatment are microfiltration, ultrafiltration, nanofiltration and reverse osmosis.

Microfiltration (commonly abbreviated to MF) is a type of a physical filtration process where a contaminated fluid is passed through a special pore-sized membrane to separate microorganisms and suspended particles from the process liquid. Microfiltration is a process of separating liquid from suspended particles 0.1-100 µm.

Ultrafiltration (UF) is a variety of membrane filtration in which forces like pressure or concentration gradients lead to a separation through a semipermeable membrane. Ultrafiltration is a membrane separation process and fractionation, concentration of substances, carried out by filtration of the liquid under the action of the pressure difference before and after membrane. Pore size ultrafiltration membranes range from 0.01-0.1 µm.

Nanofiltration (NF) is a membrane filtration-based method that uses nanometer sized cylindrical through-pores that pass through the membrane at right angles. Nanofiltration membranes have pore sizes ranging from 1-10 nanometers. Dead-end mode for the process of nanofiltration is not used, because such filtering mode inevitably leads to a rapid clogging of the membrane. Thus, the nanofiltration process can only be used in a cross-flow mode of filtration, i.e. in the presence of a flow of fluid moving along the membrane surface and jetting the discharge of the contamination.

Methods of purification of liquids through porous septum (hard microfilters and flexible membrane) are problematic as they cause deposition of particulates, biological sediments, and the formation of a film on the surface of the porous septum in the pores of membranes and microfilters. In the process of purification of liquids through porous septum, microfilters and membranes typically become clogged by suspended particles, organic contaminants, and poorly soluble compounds. Their surface may also become covered with a film of impurities on the pressure side, thus impeding the flow of fluids through a porous septum. This leads to a decrease in the specific performance of microfilters and membranes, reducing their lifetime. To restore the filtration properties of membranes and microfilters they are cleaned by various methods.

Hydrodynamic methods of cleaning porous septum include flushing of external sediments out of the pressure channel with pressurized liquid, gas-liquid emulsion, pulsating flow, backwashing with permeate. In practice, the most widely used method is the washing of the pressure channel of the filter modules with a strong jet of liquid. The washing liquid, which is often the solution itself, is pumped through the filter and membrane apparatus at a higher rate.

The choice of purification method depends on the size and characteristics of particles and substances from which it is necessary to purify the liquid. The smaller the size of particles, associates of molecules and molecules of the substances being removed, and the greater their concentration is, the more complex is the equipment and technology for filtering.

One of the ways to increase the effectiveness and reduce the cost of finishing methods for purification of liquids is preliminary physical processing of liquids to reduce the concentrations of chemical contaminants and changes in their physical-chemical properties.

Methods of hydrodynamic treatment and cavitation treatment of liquids that change their physical-chemical properties are known. Cavitation can be of many origins, including acoustic, hydrodynamic, laser-induced or generated by injecting steam into a cool fluid. Acoustic cavitation requires a batch environment and cannot be used efficiently in continuous processing, because energy density and residence time would be insufficient for a high-throughput. In addition, the effect of acoustic cavitation diminishes with an increase in distance from the radiation source. Treatment efficacy also depends on a container size as alterations in the fluid occur at particular locations, depending on the acoustic frequency and interference patterns.

When a fluid is fed in a flow-through hydrodynamic cavitation device at a proper velocity, cavitation bubbles are formed as a result of the decrease in hydrostatic pressure inside the specially designed passages. When the cavitation bubbles transit into a slow-velocity, high-pressure zone, they implode. Such implosion is accompanied by a localized increase in both pressure and temperature, up to 1,000 atm and 5,000° C., and results in the generation of local jet streams, shock waves and shearing forces. The release of a significant amount of energy activates atoms, ions, molecules and radicals located in the bubbles and/or the adjacent fluid and drives chemical reactions and processes. The bubble implosion can be coincidental with the emission of light, which catalyzes photochemical reactions. (Suslick, 1989; Didenko et al., 1999; Suslick et al., 1999; Young, 1999; Gogate, 2008; Moholkar et al., 2008; Zhang et al., 2008.)

U.S. Patent Applications Publication Nos. 2006/0081541 (Kozyuk) and 2007/0102371 (Bhalchandra et al.), and U.S. Pat. Nos. 5,393,417 and 5,326,468 to Cox, U.S. Pat. No. 9,403,697 to McGuire disclose methods and apparatuses that use cavitation for treatment and purification of water and other fluids.

Russian Patent No. 2316481 to Sister describes a method of purification of wastewater from surface-active substances, in which the water is subjected to ultrasonic cavitation at a sound radiation intensity of 1.5-3 W/cm$^2$.

Complex physical and chemical processes occur in the water subject to cavitation treatment. Its hardness decreases, i.e. water becomes softer. The electrical conductivity also decreases. The color value decreases by more than two times because of the collapse of humic acid molecules into free radicals, which precipitate. Because of intense cavitation microbiological impurities, such as bacteria, spores and viruses are almost completely neutralized in the water. Any water treatment process consists of conversion of substances dissolved in the water into insoluble substances or gases, and their subsequent removal (Kumar, J. K. Cavitation—a New Horizon in Water Disinfection. Water disinfection by ultrasonic and hydrodynamic cavitation/Verlag: VDM, 2010.—304 p. Gogate, R. P. Application of cavitational reactors for water disinfection: Current status and path forward/Journal of Environmental Management.—2007.—Vol. 85.—P. 801-815. Inactivation of Food Spoilage Microorganisms by Hydrodynamic Cavitation to Achieve Pasteurization and Sterilization of Fluid Foods/P. J. Milly [et al.]/Journal of Food Science.—2007.—Vol. 72, No. 9.—P. 414-422. Arrojo, S. A Parametrical Study of Disinfection with Hydrodynamic Cavitation/S. Arrojo, Y. Benito, A. Martinez/Ultrasonics Sonochemistry.—2007.—No. 15.—P. 903-908.).

Cavitation treatment of ethanol and alcohol beverages causes dissolution of impurities, decreases concentration of simple aldehydes and esters (acetaldehyde, methyl acetate, ethyl acetate, methanol, isopropanol, and other impurities) decreases, and precipitation by salts of heavy metals.

U.S. Patent Application No. 2013/0330454 to Mahamuni discloses a method and system for treatment of alcohol beverages. A process including ultrasonic processing by acoustic and hydrodynamic cavitation are applied to the beverage product in a controlled fashion so as to achieve a desired transformation thereon.

U.S. Patent Application No. 2016/0289619 to Mancosky disclosing the process of aging spirits to obtain aged liquors includes circulation of spirits through a cavitation zone. The method and apparatus obtain the same conversion of undesirable alcohols, flavor extraction and color as years of aging in an oak barrel.

WO Patent Application No. 2005/042178 to Lee et al. discloses an apparatus and method for the treatment of wine using ultrasonic technology. Ultrasonic cavitation is generated within the said wine thereby decontaminating wine.

In Russian patent RU2368657 (Denisov et al.) alcohol-containing liquid passes through the activator with turbulization part. After treatment of vodka in the activator, the content of Aldehydes, Fusel oils, Esters and Methyl Alcohol is decreased in it.

Accordingly, there is a need for a more efficient and consistently repeatable treatment method for the purification of beverage liquids so as to improve organoleptic properties of the beverage liquids. The present invention fulfills these needs and provides other related advantages.

SUMMARY OF THE INVENTION

The invention discloses a system and method of purification of drinking water, alcohol and alcohol beverages from microbiological and chemical contaminants, micro particles and colloidal particles. The method and device is based on the action of hydrodynamic cavitation on particles, colloidal particles, microbiological and chemical impurities. The liquid flow moves at a high rate to generate hydrodynamic cavitation features in the liquid flow to generate changes in the liquid flow's velocity, pressure, temperature, chemical composition and physical properties in order to reduce the concentration of impurities and to increase the lifetime of membranes and filters for purification of liquids from microbiological, chemical and mechanical impurities.

The method comprises the application of purification of alcoholic beverages from microbiological and chemical contaminants, particles and colloidal particles flow-through hydrodynamic cavitation to a contaminated liquid flow.

Accordingly, besides the objects and advantages of the high-speed liquid upgrading described herein, several objects and advantages of the present inventions are:
  To provide a method that provides a high-throughput combined with a high efficiency of purification.
  To provide an apparatus that promptly generates changes in a liquid flow's velocity, pressure, temperature, chemical composition and properties.
  To provide a compact apparatus for use as in an industrial plant and a domestic version at home.
  To provide a compact apparatus, in which cavitation facilitates destruction of contaminants.

To provide a system that increases organoleptic indices of alcoholic beverages.

The present invention is directed to a system for purifying and improving the organoleptic properties of beverages by, inter alia, reducing impurities affecting flavor, aroma and visual quality. The system includes a beverage vessel, a motor, a pump, and a tube assembly having an extraction tube and a cavitating tube. The pump is configured to draw liquid from the beverage vessel through the extraction tube. The outlet from the pump sends the beverage liquid through the cavitating tube at sufficient pressure and liquid flow rate to generate hydrodynamic cavitation at one or more cavitator elements in the cavitating tube, which returns the processed liquid to the beverage vessel.

The present invention is directed to a system for purifying and improving the organoleptic properties of beverage fluids. The system includes a beverage vessel having a generally cylindrical, elongated body for containing the beverage fluid. A processing apparatus is configured for sealed insertion into an open top of the beverage vessel. The processing apparatus includes a beverage pump having an inlet and an outlet, a tube assembly, and a motor. The processing apparatus may further include a drive shaft fixedly engaged with a rotor in the motor and extending into the pump, where it is fixedly engaged with a driving gear in the pump.

The tube assembly is selectively, removably connected to the pump. The tube assembly has an extraction tube fluidly connected the inlet on the pump and a discharge tube fluidly connected to the outlet on the pump. In a first preferred embodiment, the extraction tube and the discharge tube are preferably disposed in a side-by-side configuration, further comprising a first sealing ring disposed around the extraction tube where it connects to the inlet and a second sealing ring disposed around the discharge tube where it connects to the outlet. The first and second sealing rings are preferably O-rings.

In a second preferred embodiment, the extraction tube and the discharge tube are preferably disposed in a concentric configuration, with the discharge tube disposed within the extraction tube and extending from both an upper end and a lower end of the extraction tube. The connection element encloses both an upper end of the discharge tube and the upper end of the extraction tube, and further comprises a first sealing ring and a second sealing ring disposed around the connection element where it connects to the pump.

In either embodiment, the discharge tube comprises a cavitator device consisting of a plurality of cavitating elements disposed along a length of the discharge tube. In the first preferred embodiment, the plurality of cavitating elements each comprise a twisted plate having a width generally equal to a diameter of the discharge tube. The discharge tube preferably has at least two cavitating elements, each cavitating element comprising a twisted or helical plate disposed along the cavitating tube. The cavitating tube preferably includes a plurality of cavitating elements spaced along the length of the cavitating tube and occupying approximately half of the total length thereof. Each of the plurality of cavitating elements is secured and sealed in the discharge tube by a retaining ring disposed between the cavitating element and a wall of the discharge tube. The retaining ring is made from polyoxymethylene.

In the second preferred embodiment, in addition to the twisted plate, each of the plurality of cavitating elements further comprise a Venturi tube element disposed immediately following each twisted plate. The plurality of cavitating elements is secured and sealed in the discharge tube by an upper retaining ring disposed in an upper end of the discharge tube and a lower retaining ring disposed in a lower end of the discharge tube. The upper retaining ring and the lower retaining ring are both made from a polyacetal copolymer material or polyoxymethylene (such as POM-C™ from Nylacast Ltd. Co.) or similar material.

The cavitating of the beverage liquid includes generating hydrodynamic cavitation in the liquid by changing liquid velocity and liquid pressure within the cavitating tube. The hydrodynamic cavitation alters temperature, chemical composition and physical properties of the treatment liquid. The pumping may be run as a continuous batch with processed liquid being returned to the beverage vessel to be blended with remaining liquid and be drawn through the extraction tube for re-processing.

The beverage fluid may include alcohol, such as vodka, brandy, whiskey, rum, gin, wine, and aqueous solutions of natural or synthetic alcohols. The alcoholic beverages may be crude, filtrated, or purified. The beverage fluid may also include drinking water, tap water, artesian water, well water, spring water, lake water, or fresh water.

The present invention is directed to a process for purifying and improving the organoleptic properties of beverages. The process begins with providing the vessel containing a quantity of beverage fluid to be purified. The processing apparatus is preferably inserted into the vessel such that the extraction tube and the discharge tube extend into the quantity of beverage fluid. A portion of the beverage fluid is drawn from the vessel into the extraction tube. The portion of the beverage fluid drawn from the extraction tube is then pumped into the discharge tube. When pumped into the discharge tube, the portion of the beverage fluid is passed across a plurality of cavitation elements dispersed along the discharge tube. Hydrodynamic cavitation is generated in the portion of the beverage fluid as it passes across each of the plurality of cavitation elements. The portion of the beverage fluid is then discharged from the discharge tube back into the vessel.

The processing apparatus further comprises a monolithic motor and pump, having an inlet on the pump connected to the extraction tube and an outlet on the pump connected to the discharge tube. In a first preferred embodiment, the extraction tube and the discharge tube are substantially parallel in relative orientation. In a second preferred embodiment, the extraction tube and the discharge tube are substantially concentric in relative orientation. The process further includes recycling the portion of the beverage fluid discharged from the discharge tube by mixing it with the beverage fluid in the vessel. The process also includes repeating the drawing, pumping, passing, generating, and discharging steps for a predetermined minimum processing time.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
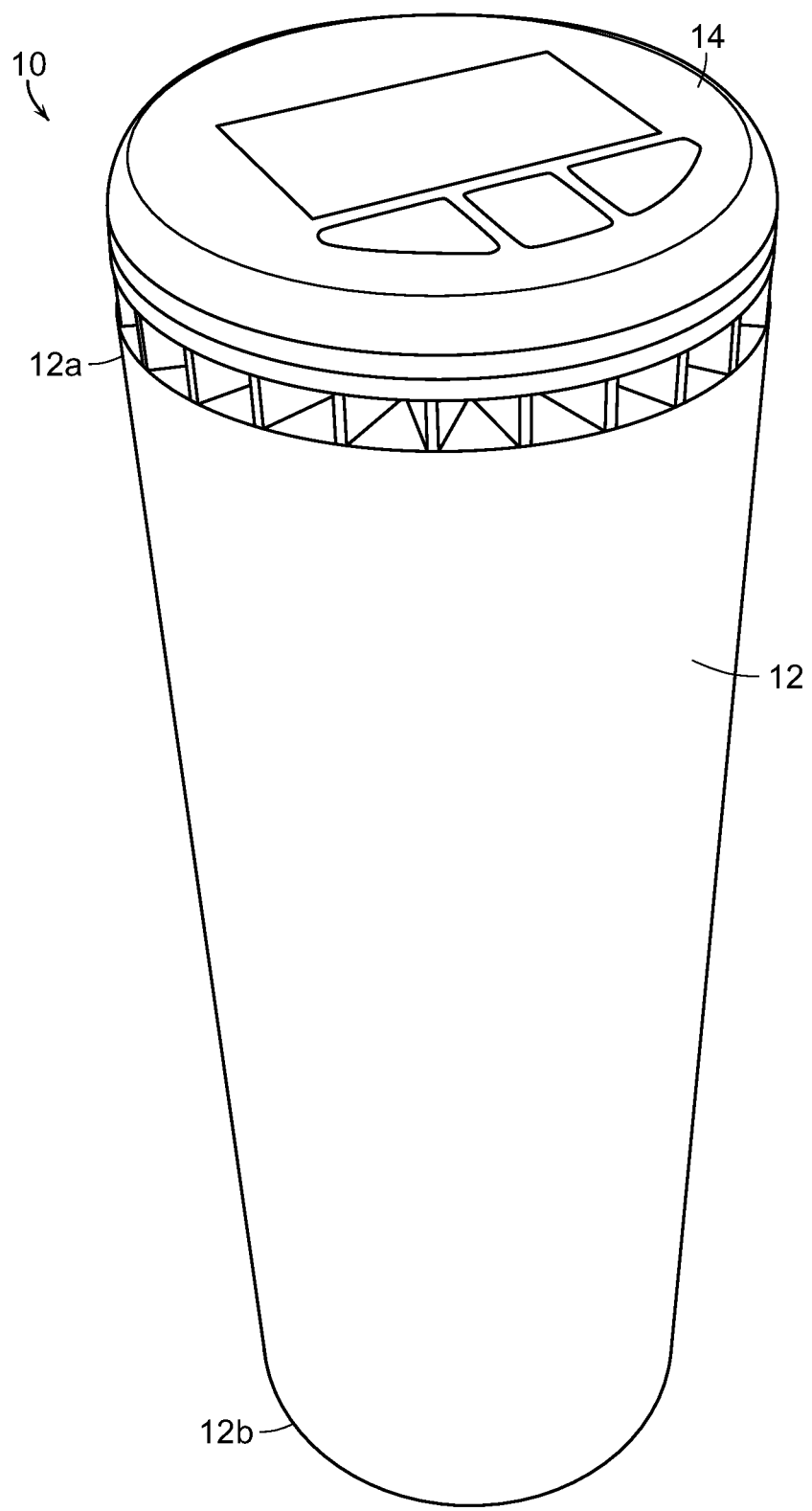
FIG. 1 is a perspective view of the liquid processing system of a preferred embodiment of the present invention.

The present invention is directed to a system and method for purifying and improving the organoleptic properties of beverages, specifically alcoholic beverages. In the following discussion, the system will generally be referred to by reference numeral 10 when describing the first preferred embodiment and 10' when describing the second preferred embodiment. Similar parts will be referred to using similar part or reference numerals across the two preferred embodiments.

Figure 2:
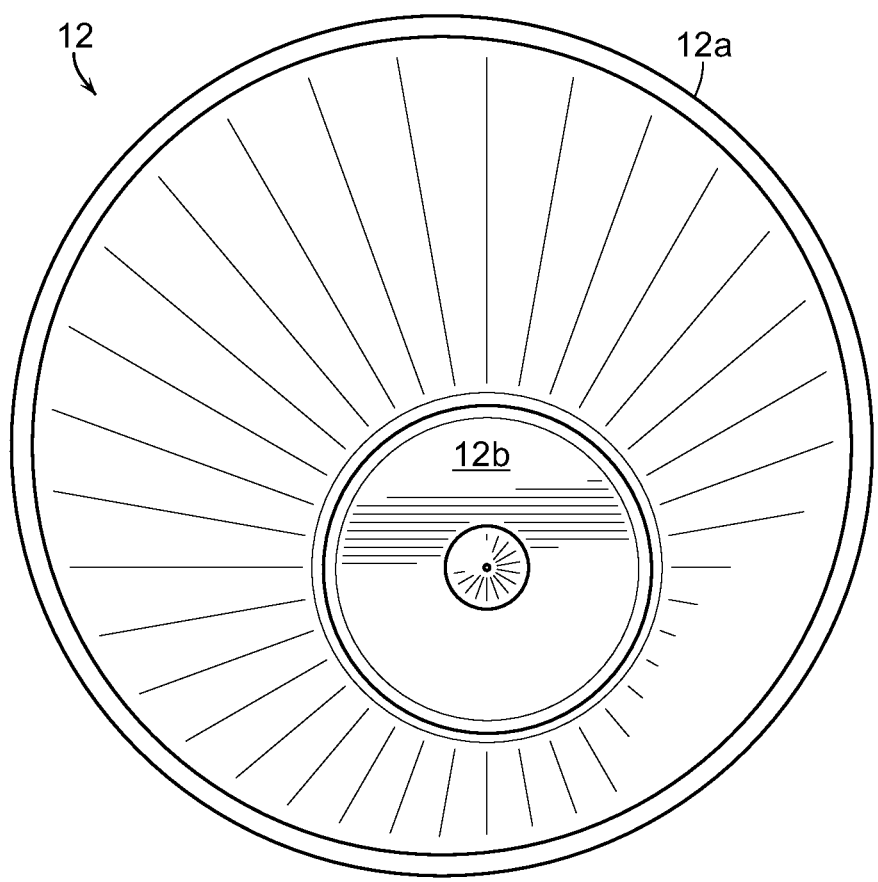
FIG. 2 is a top view of the beverage vessel from the liquid processing system of the preferred embodiment.

In the first preferred embodiment, illustrated in FIGS. 1-8, the major components of the system 10, include a liquid vessel 12 and a processing apparatus 14, with the processing apparatus 14 configured to be inserted inside the vessel 12. As shown in FIGS. 1-2, the vessel 12 is generally cylindrical in shape with an open top 12a and a closed bottom 12b. The vessel 12 is of sufficient size to accommodate a quantity of beverage liquid desirable to process. The system 10 may be used to purify and improve the properties of beverage liquid for a single person or a greater quantity. Most preferably, the system 10 is used to process a large quantity of beverage liquid such as a liter or gallon or more. The system 10 is designed for a home or personal use, but the principles may be scaled up to accommodate commercial quantities of beverage liquid.

Figure 3:
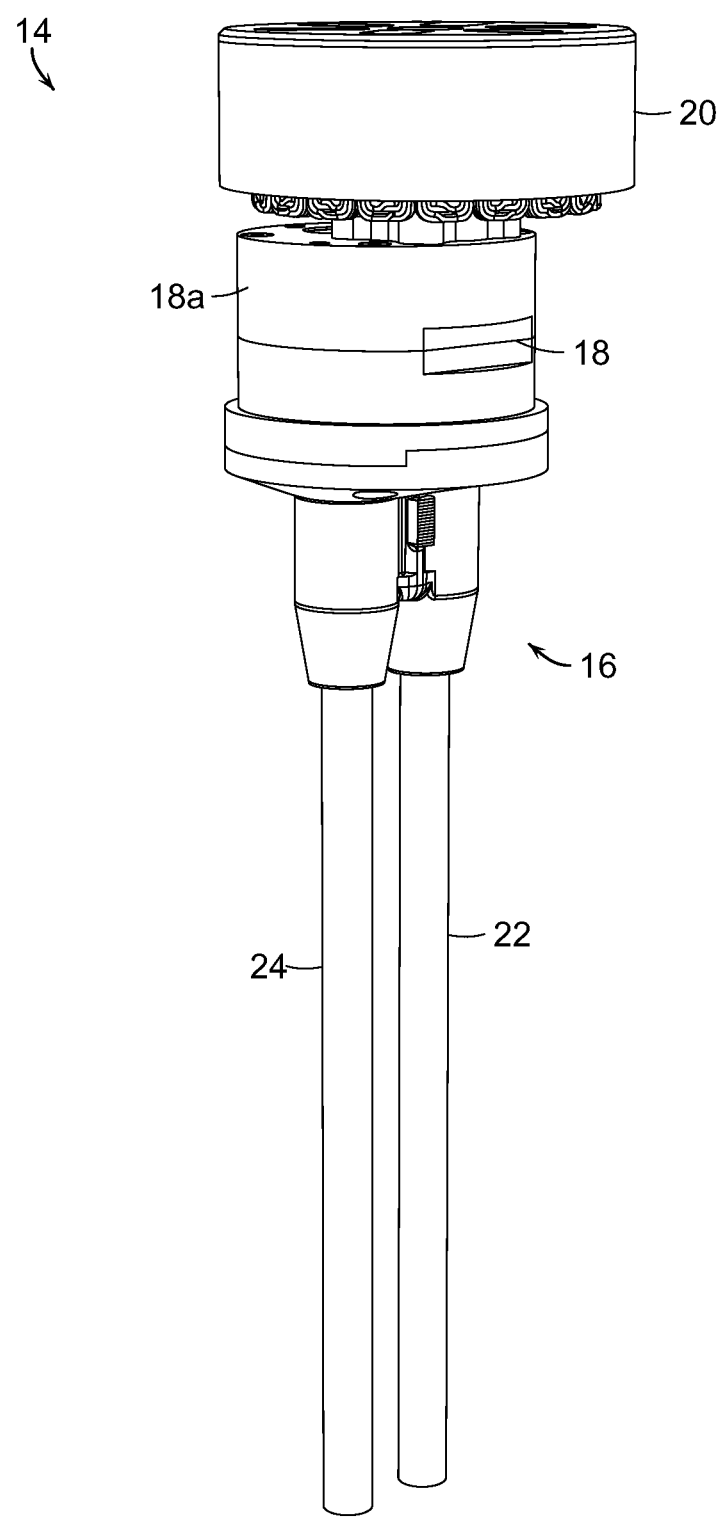
FIG. 3 is a perspective view of a processing apparatus of the liquid processing system of a first preferred embodiment.

As shown in FIG. 3, the processing apparatus 14 consists primarily of a tube assembly 16, a pump 18, and a motor 20. The tube assembly 16 is primarily an extraction and discharge element designed to draw beverage liquid out of the vessel 12 and then return the processed beverage liquid to the vessel 12. The tube assembly 16 has an extraction tube 22 and a discharge tube 24, both of which extend into the vessel 12 through the open top 12a and substantially the entire length of the vessel 12, so as to end proximate to the closed bottom 12b of the vessel 12.

Figure 4:
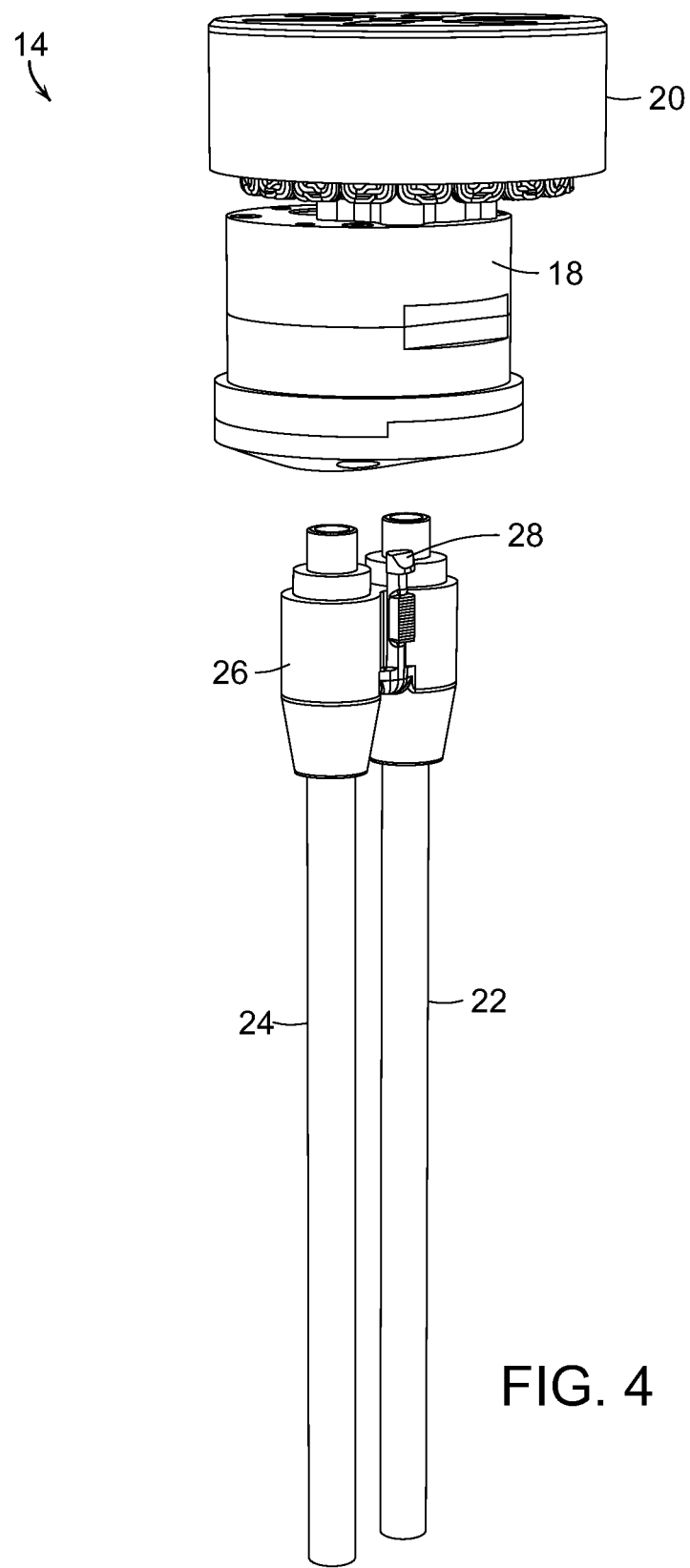
FIG. 4 is a partially exploded perspective view of the processing apparatus of the liquid processing system of the first preferred embodiment.
Figure 5:
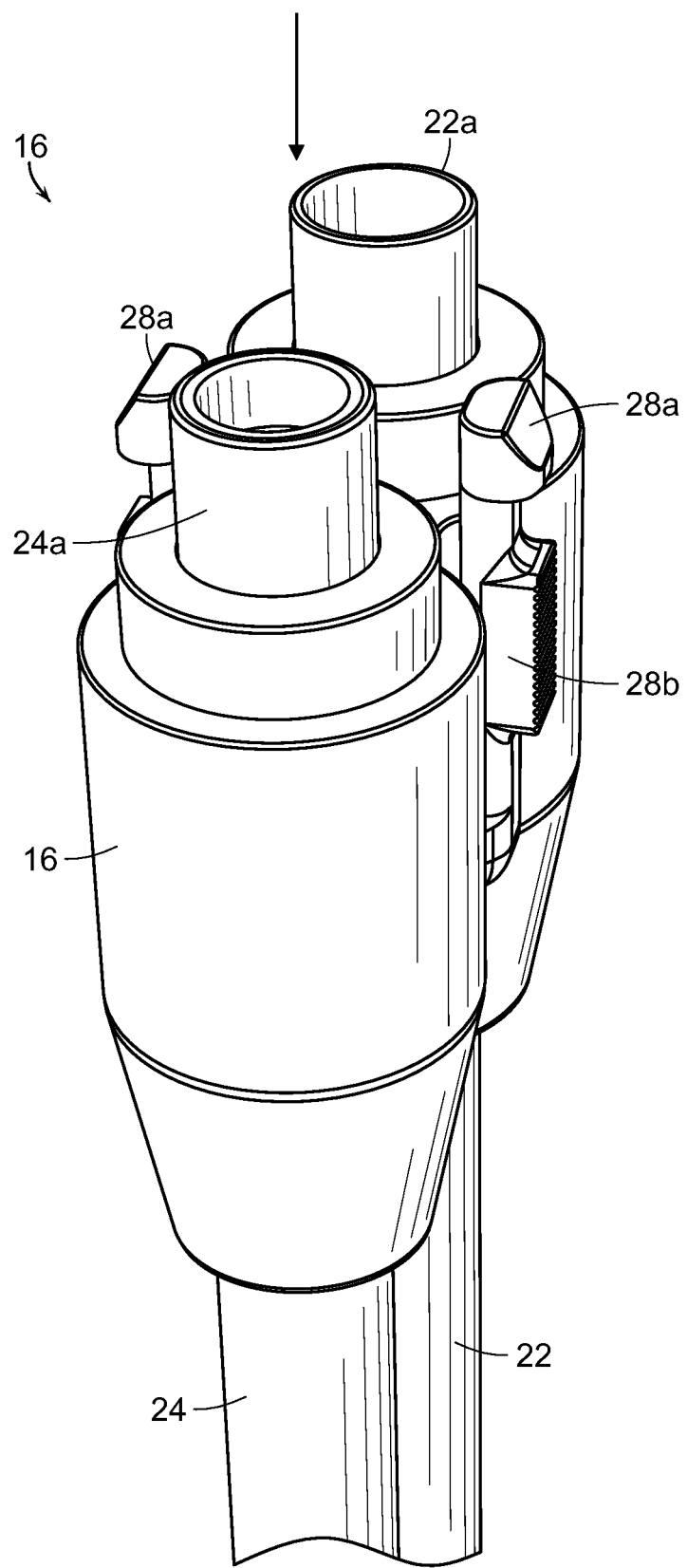
FIG. 5 is a close-up view of the tube assembly from the processing apparatus of the liquid processing system of the first preferred embodiment.
Figure 6:
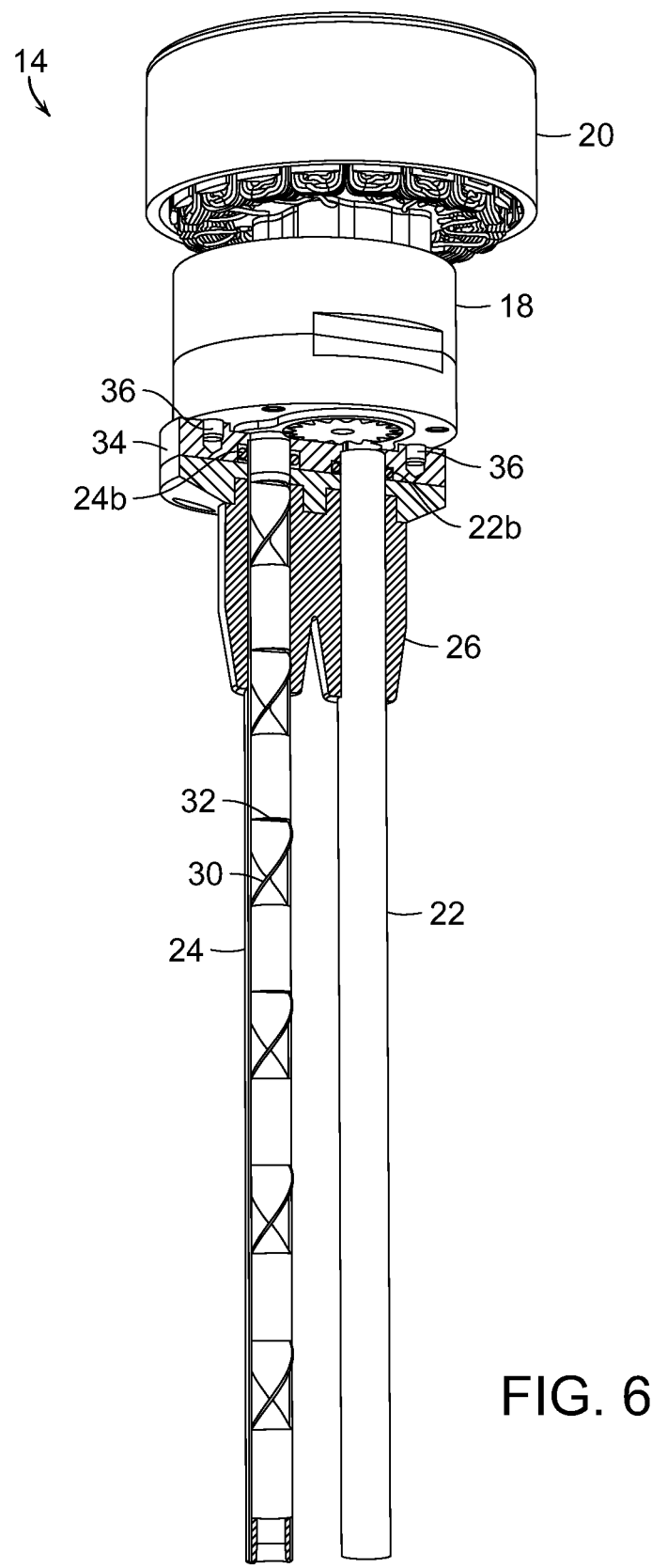
FIG. 6 is a partial cross-sectional, perspective view of the processing apparatus showing the tube assembly of the first preferred embodiment in cross-section.

The extraction tube 22 and discharge tube 24 are mounted in a tube housing 26, which is removably connected to the processing apparatus 14 as shown in FIGS. 4-5. The tube housing 26 connects to the underside of the pump 18 through insertion of an extraction tube head 22a and a discharge tube head 24a into an inlet port 34a and an outlet port 34b (FIG. 8) on the underside of the pump 18. The tube heads 22a, 24a have a very tight interference fit with the ports 34a, 34b on the underside of the pump 18. As shown in the cross-section of FIG. 6, the ports 34a, 34b include a sealing gasket 22b, 24b around each tube head 22a, 24a to prevent leakage of liquid. For the extraction tube 22, the sealing gasket 22b is preferably an O-ring or similar style. For the discharge tube 24, the sealing gasket 24b may be any preferred style gasket to fluidly seal a tube in a port, including an O-ring.

A locking pin 28 is presented on at least one side of the tube housing 16, but preferably on both sides. The locking pin 28 has an offset head 28a or similar structure configured to engage a notch or groove 28c (FIG. 8) on the underside of the pump 18. The locking pin 28 is preferably resiliently biased such that the offset head 28a will fully engage the notch 28c. The tube assembly 16 can be removed from the pump 18 by pressing on button 28b to counter the resilient bias of the locking pin 28 and release the offset head 28a from the notch 28c. The tube assembly 16 can then be removed from the pump 18 by pulling in the direction of the arrow shown in FIG. 5.

The tube housing 26 is generally an enclosure for upper ends of the tubes 22, 24. As shown in cross-section in FIG. 6, the tube housing is basically a pass-through body, wherein the extraction tube 22 and discharge tube 24 pass-through such that the tube heads 22a, 24a protrude from the top of the tube housing 26. The extraction tube 22 is a basic open, cylindrical tube that acts a straw to draw the beverage liquid from the vessel 12 under suction from the pump 18. Preferably, the end of the extraction tube 22 is proximate to the bottom 12b of the vessel 12 so as to draw liquid from all parts of the vessel 12.

The discharge tube 24 returns beverage liquid from the pump 18 to the vessel 12. The discharge tube has an outer open tube 24b that contains at least one, but preferably a plurality of cavitating elements 30 distributed along the length of the open tube 24b. The cavitating elements 30 each comprise a helical shape or twisted plate designed to cause twisting or turbulence in the liquid flow, as described more fully below. Each cavitating element 30 is preferably held in place by a ring 32 designed to create a friction fit between the cavitating element 30 and the wall of the tube 24b. The ring 32 is preferably made from a food tolerant and alcohol resistant material such as a polyacetal copolymer material or polyoxymethylene (POM-C™ from Nylacast Ltd. Co.) or similar material. Most preferably, the discharge tube 24 contains sufficient cavitating elements 30 such that when evenly spaced along the length of the discharge tube 24, the cavitating elements 30 cumulatively occupy at least half of the length of the discharge tube 24.

The cavitating elements 30 for generating cavitation in the beverage liquid preferably comprise a twisted plate or similar element to form a spiral to tighten the flow of liquid for inception of cavitation. The twisting of the liquid flow through the spiral provides sufficient turbulence in the flow to generate macro vortexes in the liquid flow, which is accompanied by local pressure decreases to the saturated vapor point of the liquid at the given temperature. When this happens, the proper conditions for the growth of cavitation nuclei in the cavitation bubbles are reached. The formed cavitation bubbles pulse and implode in downstream zones between each of the plurality of cavitating elements 30.

Figure 7:
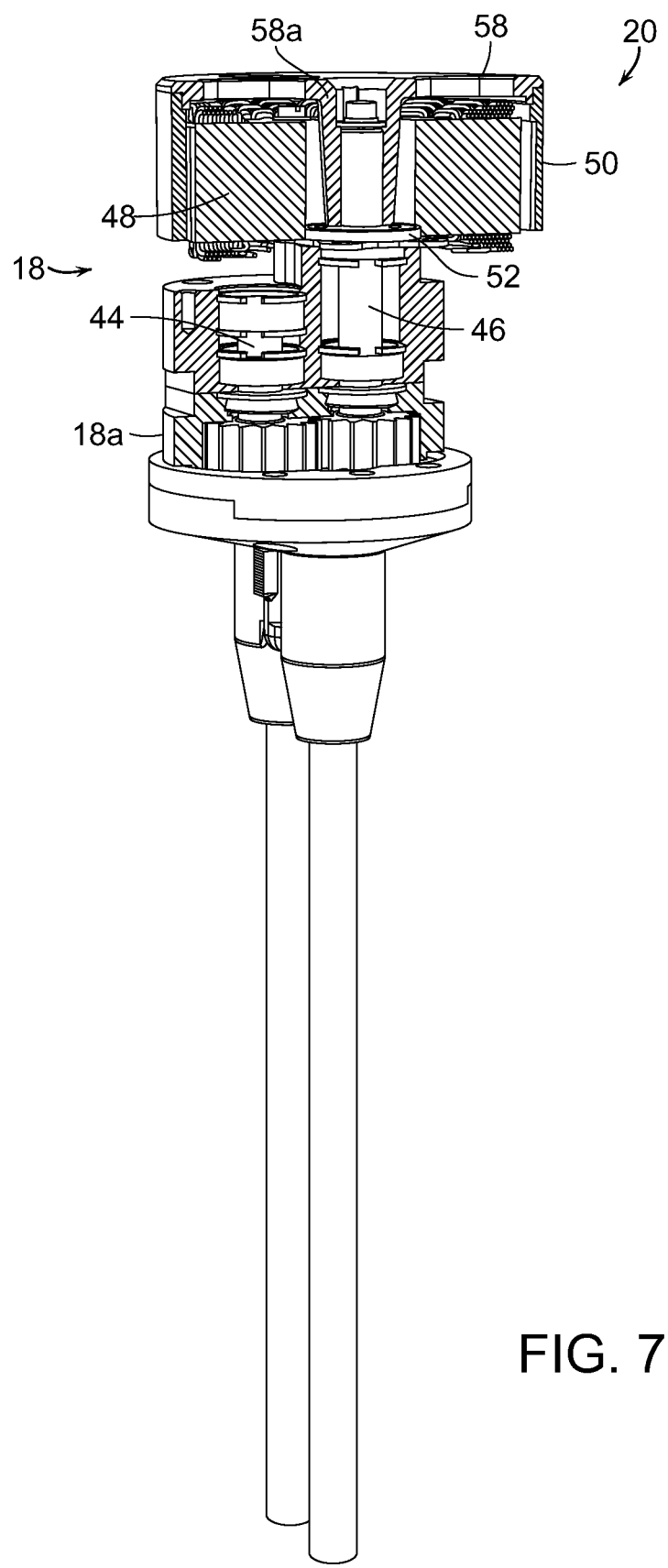
FIG. 7 is a partial cross-sectional, perspective view of the processing apparatus showing the pump and motor of the first preferred embodiment in cross-section.
Figure 8:
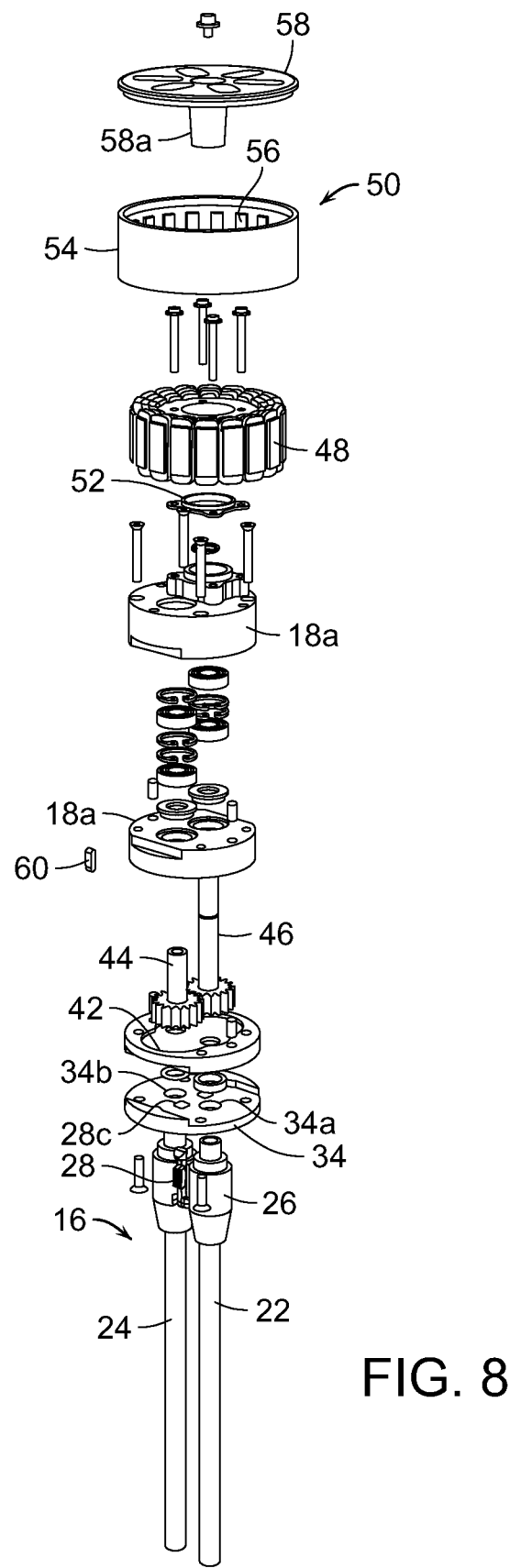
FIG. 8 is an exploded perspective view of the processing apparatus of the liquid processing system of the first preferred embodiment.

FIG. 7 shows the pump 18 and motor 20 in cross-section view to detail the respective parts and their connections therein. FIG. 8 shows all of the parts of the pump 18 and motor 20 in an exploded view to further detail its assembly and operation.

The pump 18 is connected to the tube assembly 16 as described above. More particularly, the tube assembly 16 is connected to a base plate 34 on the pump body 18a. One or more retaining pins 36 are preferably included to lock the base plate 34 into a fixed rotational position relative to the pump body 18a. The base plate 34 is the element that includes the inlet port 34a and the outlet port 34b for engagement with the pipe heads 22a, 24a as described.

The pump 18 comprises a housing or body 18a that encloses a driving gear 38 and a driven gear 40, which are engaged with each other in a working chamber 42 that is fluidly connected to both the inlet port 34a and outlet port 34b. A plurality of seals (shown but not numbered) is included to seal against leaks in the entrance of the inlet port 34a and outlet port 34b to the working chamber 42. Additional seals (shown but not numbered) are included in the pump housing 18a above the working chamber 42 to prevent the introduction of beverage liquid into the main body 18a of the pump 18. In addition, a plurality of pins (shown but not numbered) is included to prevent relative rotation of the various parts of the pump body 18a.

The driven gear 40 is fixedly mounted on an idle shaft 44 that is wholly contained within the pump body 18a. The idle shaft 44 is mounted using a plurality of low friction bearings (shown but not numbered) to allow for relatively unimpaired rotation of the idle shaft 44 during operation. Locking rings (shown but not numbered) are included to keep the bearings in position on the idle shaft 44.

The driving gear 38 is fixedly mounted on a drive shaft 46 that extends out of the top of the pump body 18a. The drive shaft is mounted on at least one low-friction bearing (shown but not numbered) to allow for relatively unimpaired rotation of the drive shaft 46 during operation. Additional low-friction bearings can be included to provide increased stability. Locking rings (shown but not numbered) as included to keep the bearings in position on the drive shaft 46.

The drive shaft 46 extends from the top of the pump body 18a and into the motor 20. The motor 20 comprises a stator 48 and an encircling rotor 50 concentrically disposed on the drive shaft 46. The stator 48 is a common wire wound stator 48 as is known in the art. The stator 48 is fixed to the pump body 18a by a dielectric ring 52 disposed between the two. The dielectric ring 52 serves to insulate the pump 18 against conduction of electrical current from the motor 20.

The rotor 50 has a steel ring 54 carrying a plurality of magnets 56 around its perimeter and a cover disk 58 that is press fit onto the top of the steel ring 54. The cover disk 58 has a central column 58a that is configured to fit over the top of the drive shaft 46 and lock the rotor 50 thereto as with a screw or other securing mechanism. A key fixation element 60 is preferably used to connect the rotor 50 to the drive shaft 46 and ensure adequate transfer of torque.

The system 10 for purifying and improving the organoleptic properties of beverages, specifically alcoholic beverages is preferably made on a scale suitable for a single batch, table-top home unit, but can be made in an industrial version for high performance and volume through-put. A preferred embodiment of the table-top version of the system 10 for is shown in isometric view in FIG. 1. In this embodiment, the vessel 12 preferably has a capacity of 0.2-1.0 gallons in volume. The processing apparatus 14 is inserted into the vessel 12 such that the tube assembly 16 extends toward the bottom 12b.

The inventive beverage fluid treatment system 10 functions as follows. An alcoholic beverage is poured into the vessel 12 and the processing apparatus 14 is inserted into the vessel 12, with the tube assembly 16 extending toward the bottom 12b of the vessel 12. The top of the processing apparatus 14 (containing the pump 18 and motor 20) covers the open top 12a of the vessel 12 so as to enclose the beverage fluid. With a source of electrical power (not shown) supplied by wire or battery, the motor 20 activates the pump 18 so that beverage fluid is drawn from the vessel 12 into the extraction tube 22. The pump 18 then forces the beverage fluid from the extraction tube 22 into the discharge tube 24.

The action of the pump 18 forces the beverage fluid through each of the cavitation elements 30 dispersed along the length of the discharge tube. Because of the acceleration that occurs in the beverage fluid as it passes over the cavitation elements 30, cavitation bubbles are formed as described above. The cavitated beverage fluid is then expelled from the end of the discharge tube 24 back into the vessel 12. The processing apparatus 14 runs continuously such that the treated beverage fluid is mixed with the fluid remaining in the vessel 12 and drawn back into the extraction tube 22 so that it is reprocessed through the processing apparatus 14 for as long as the system is operated.

Figure 9:
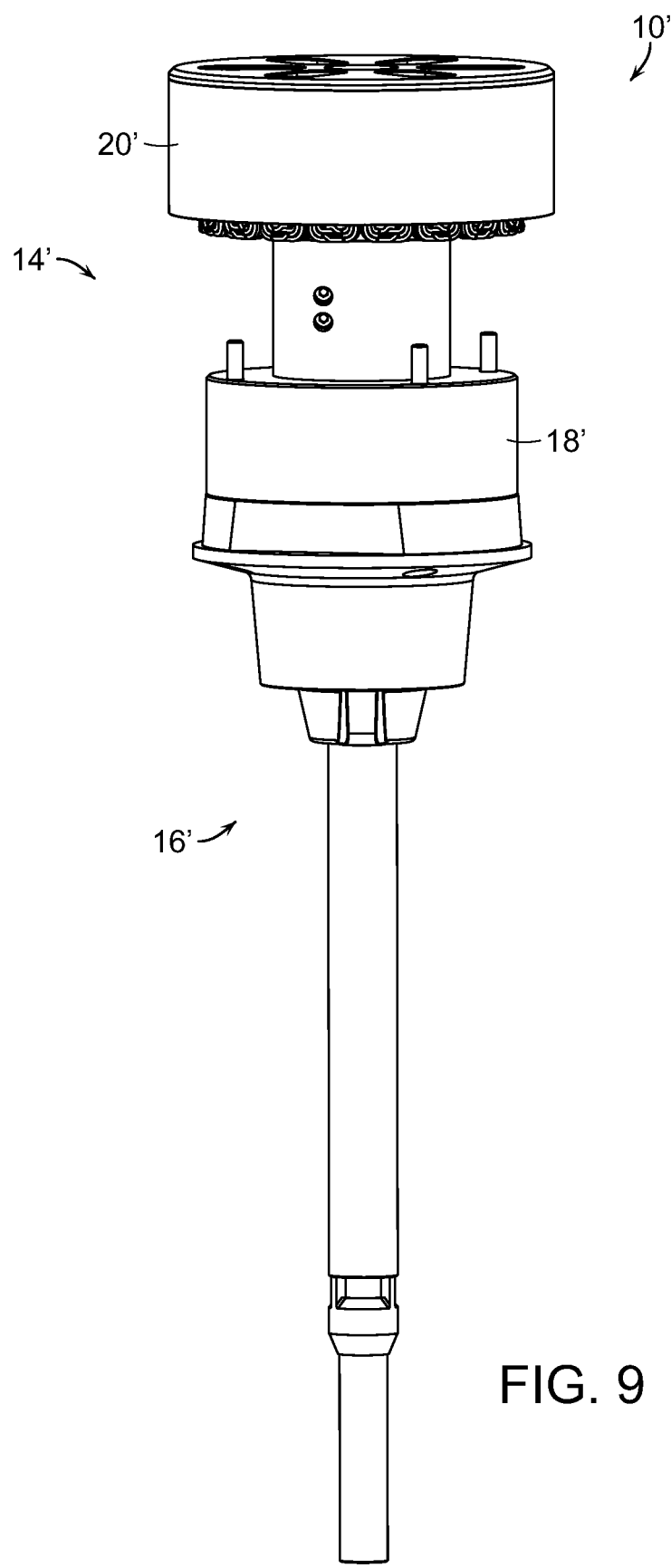
FIG. 9 is a perspective view of a processing apparatus of the liquid processing system of a second preferred embodiment.

A second preferred embodiment, generally shown in FIGS. 9-13, operates on principles similar to the first preferred embodiment. The following discussion will use similar part numbers for similar components. For the second preferred embodiment, the system 10' generally uses a liquid vessel 12 similar or identical to that described above for the first preferred embodiment. The difference between the first and second preferred embodiments resides in the processing apparatus 14, 14'. As shown in FIG. 9, the processing apparatus 14' of the second preferred embodiment comprises a tube assembly 16', pump 18', and motor 20'.

Figure 10:
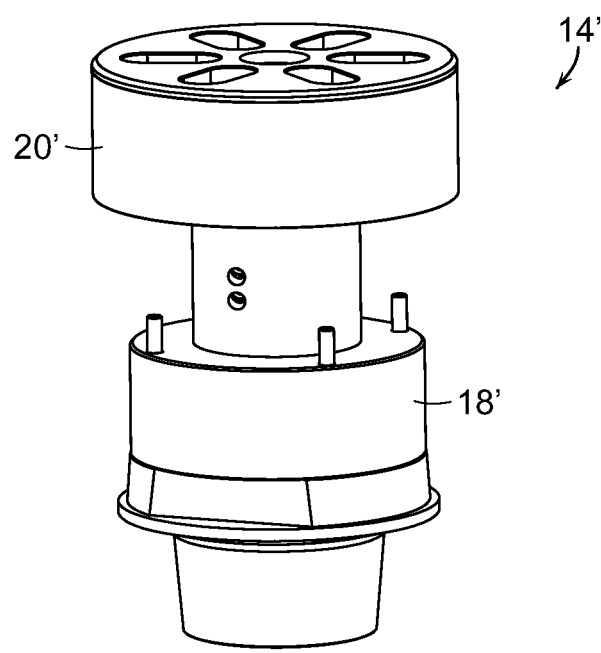
FIG. 10 is a partially exploded perspective view of the processing apparatus of the liquid processing system of the second preferred embodiment.
Figure 10:
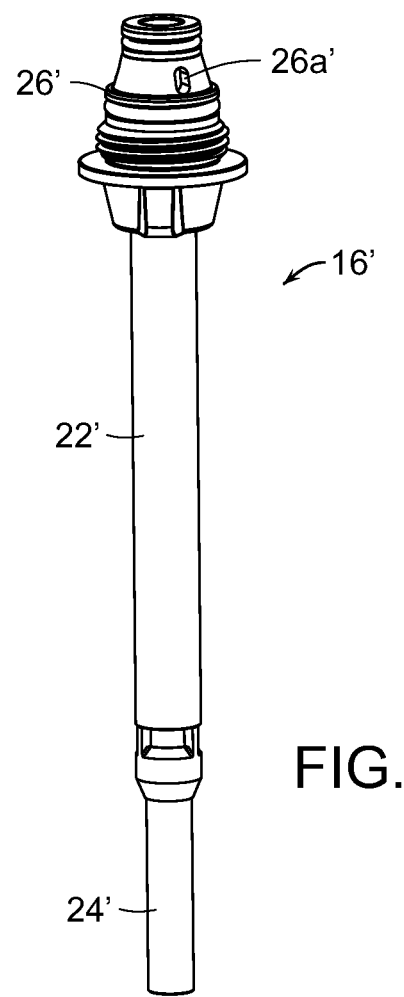

According to the second preferred embodiment, the processing apparatus 14' comprises a monolithic arrangement of the tube assembly 16', pump 18', and motor 20', preferably a brushless motor. FIG. 10 illustrates how the tube assembly 16', capped by a tube retention element 26', is selectively connectable to and separable from a port (not shown) on the underside of the pump 18' by threads or a similar structure on the retention element 26'. This configuration is preferred for ease of maintenance of the pump 18', as well as, the tube assembly 16'. The retention element 26' preferably has at least two sealing O-rings 26b' or similar seals disposed around its perimeter, designed to seal against fluid leaks when the retention element 26' is attached to the pump 18'.

Figure 11:
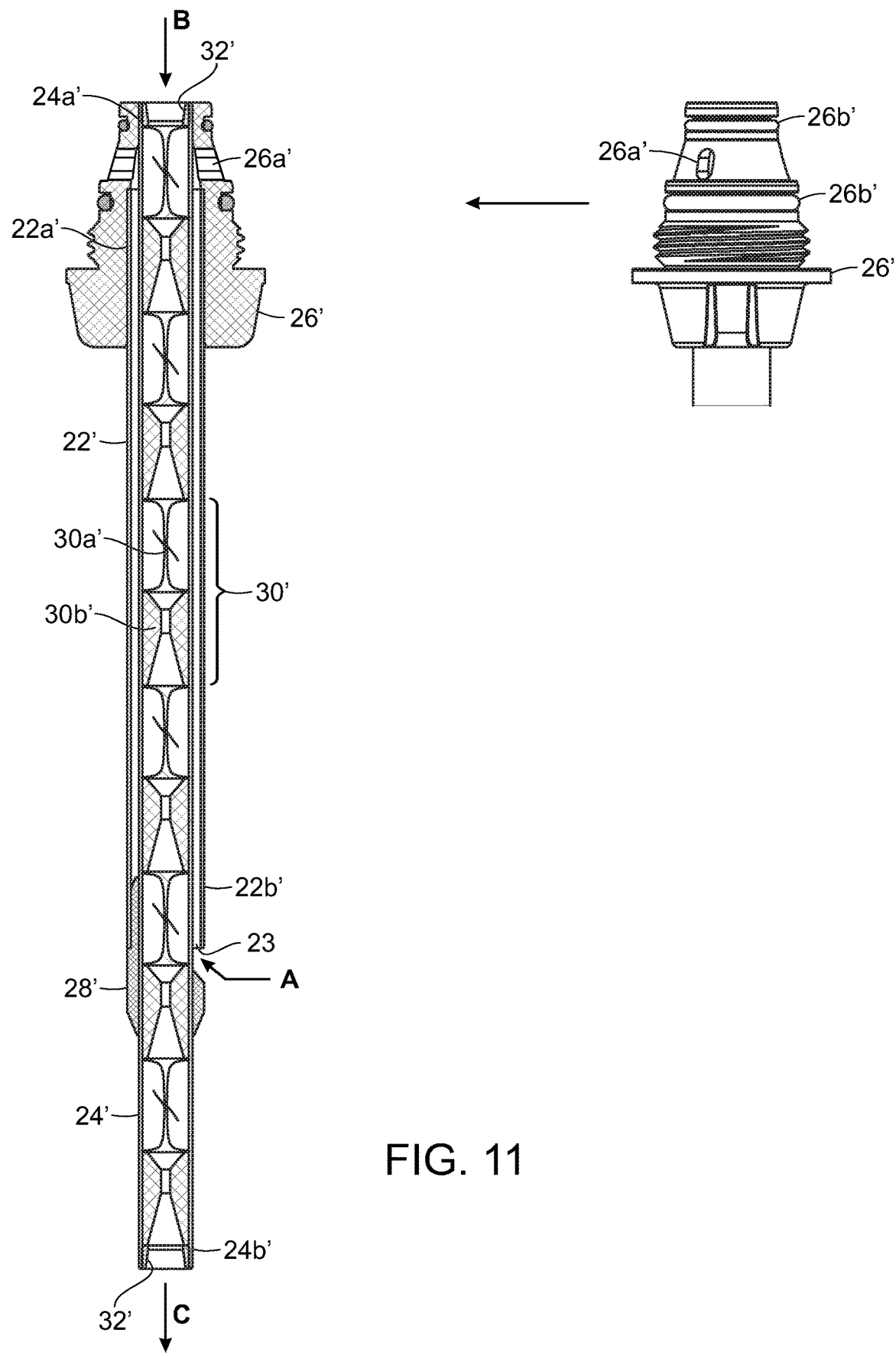
FIG. 11 is a partial cross-sectional, perspective view of the processing apparatus showing the tube assembly of the second preferred embodiment in cross-section.

In FIG. 11, the tube assembly 16' and retention element 26' are shown in cross-sectional view. The tube assembly 16' includes an intake tube 22' concentrically disposed around a cavitating tube 24'. The intake tube 22' and cavitating tube 24' are connected to the retention element 26' at their upper ends 22a', 24a', with the upper end 24a' of the cavitating tube 24' extending slightly above the upper end 22a' of the intake tube 22'. In addition, the intake tube 22' has a length that is shorter than the cavitating tube 24' such that when the two tubes 22', 24' are connected at their upper ends 22a', 24a' to the retention element 26', the lower end 24b' of the cavitating tube 24' protrudes from the lower end 22b' of the intake tube 22'. The difference in length between the intake tube 22' and the cavitating tube 24' should be sufficient such that the intake tube 22' draws untreated or blended beverage fluid from the vessel 12 rather than beverage fluid that has just been discharged from the lower end 24b' of the cavitating tube 24'. A locking ring 28' is disposed around the cavitating tube 24' and inserted into the bottom end of the intake tube 22' so as to maintain an aligned concentric relationship. This ensures that the intake port 22b' is open and unobstructed to receive beverage fluid.

After beverage fluid enters through intake port 23 proximate to the lower end 22b' of the intake tube 22' in the direction of arrow A, the fluid travels up the space between the concentric intake tube 22' and cavitating tube 24'. At the top of the tubes 22a', 24a', the fluid is exits the intake tube 22' and passes through discharge port 26a' into a working chamber 42' (see below) in the pump 18'. Multiple discharge ports 26a' may be provided. Once in the working chamber 42', the fluid is directed to the top 24a' of the cavitating tube 24' in the direction of arrow B. The fluid then passes through the length of the cavitating tube 24' and exits from the bottom 24b' in the direction of arrow C.

The cavitating tube 24' comprises a plurality of cavitating elements 30' arranged in series. Each cavitating element 30' consists of a helical plate 30a' immediately followed by a Venturi tube element 30b', with the outlet of the Venturi tube element 30b' leading into the next helical plate 30a'. The helical plate element 30a' operates as described above. The Venturi tube element 30b' comprises a sharp narrowing in the flowpath for the fluid before expanding outward to the original width of the flowpath. Such a narrowing of the flowpath results in a sharp increase in velocity of fluid flow and a decrease in fluid pressure through the application of Bernoulli's principle. Such decrease in fluid pressure results in the formation of vapor bubbles and corresponding cavitation effects.

Preferably, there are sufficient cavitating elements 30' along the length of the cavitating tube 24' so as to maximize the amount of cavitation to occur along the given length. The top intake port 24a' and bottom discharge port 24b' preferably include retaining rings 32' to fix the cavitating elements 30' in place. Each retaining ring 32' can be made from any material having appropriate food and/or beverage tolerance and resistance to alcohol. In a particularly preferred embodiment, the rings 32' are made from a polyacetal copolymer material or polyoxymethylene, such as POM-C™ from Nylacast Ltd. Co.

Figure 12:
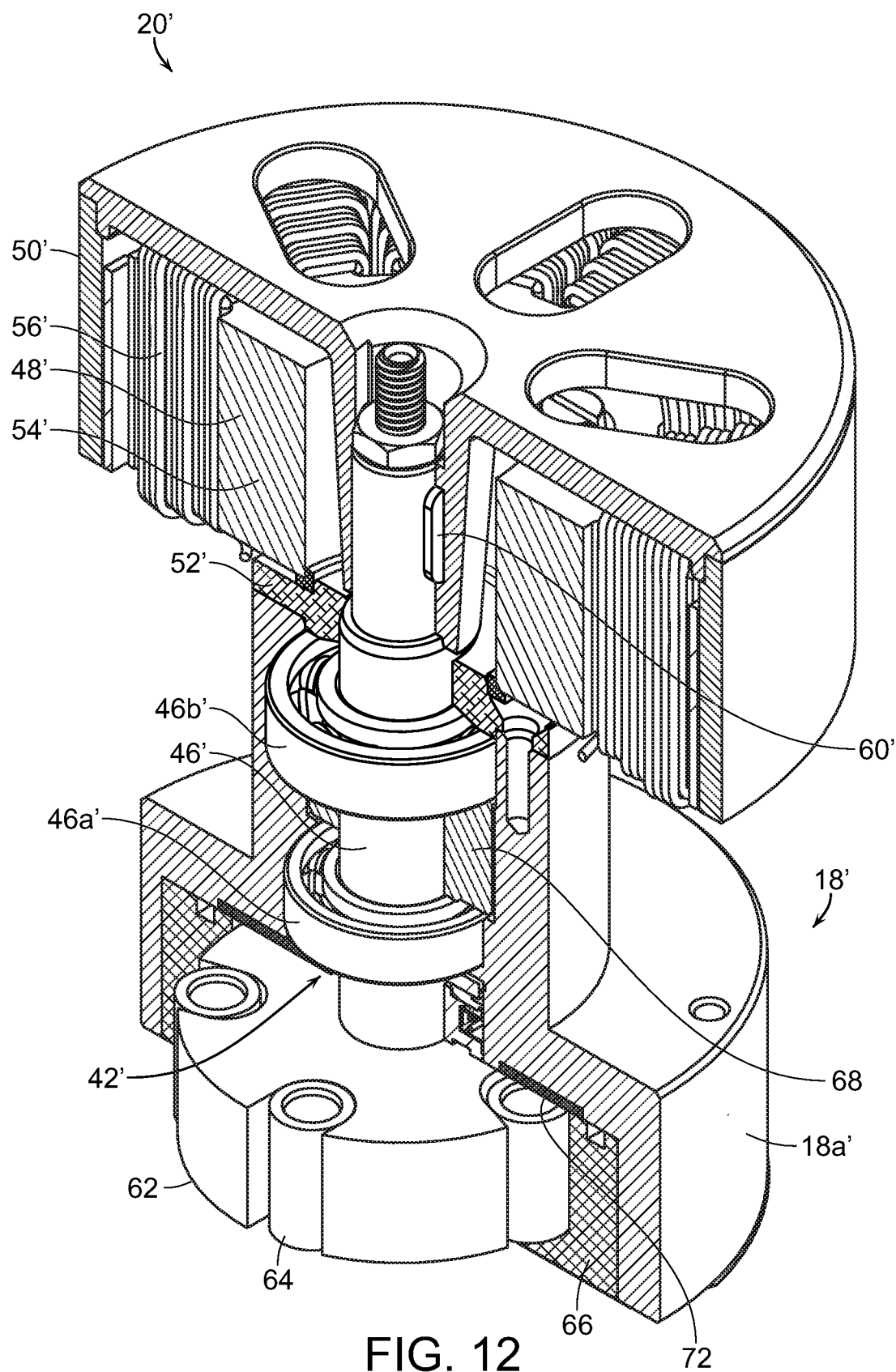
FIG. 12 is a partial cross-sectional, perspective view of the processing apparatus showing the pump and motor of the second preferred embodiment in cross-section.
Figure 13:
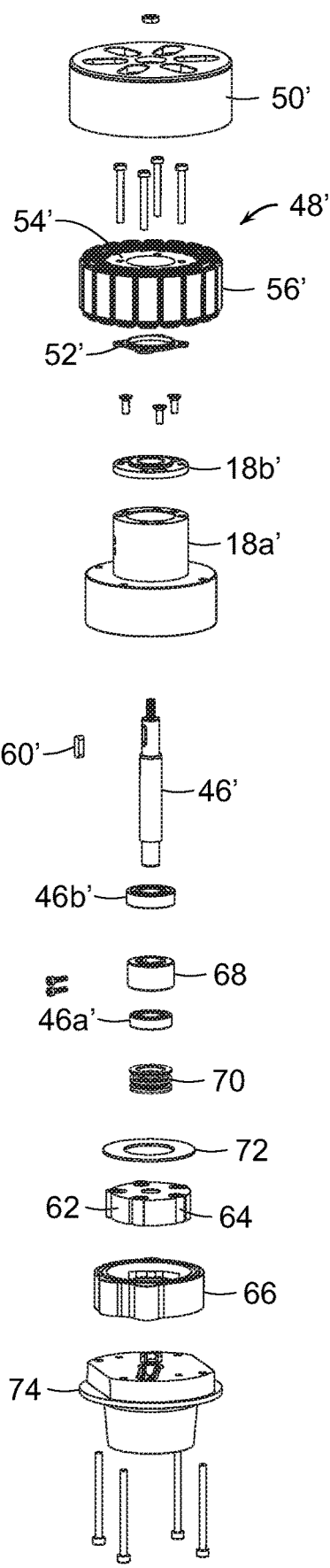
FIG. 13 is an exploded perspective view of the processing apparatus of the liquid processing system of the second preferred embodiment.

FIGS. 12 and 13 show the general assembly of the pump 18' and motor 20'. The motor 20' is disposed at the upper most end of the processing apparatus 14' and comprises a stator 48' contained within a rotor 50'. The stator 48' is constructed from a plurality of magnets 56' disposed around the perimeter of a steel ring 54'. A single-piece drive shaft 46' passes through the stator 48' and is joined to the stator 50' by a counter nut or similar connection. A key ring 60' locks the drive shaft 46' to the rotor 50' to ensure that the rotation of the rotor 50' rotates the drive shaft 46'. The drive shaft 46' extends from the bottom of the motor 20' and is the means by which the motor 20' transmits the required toque to the pump 18'. A dielectric spacer 52' is disposed on the underside of the motor 20'. A plurality of screws or similar retention devices connects the stator 48' to the dielectric spacer 52'.

The dielectric spacer 52' of the motor 20' is attached to the top of pump 18', namely the pump housing 18a', which is preferably made from stainless steel or similar material. The pump housing 18a' includes a cover 18b' designed to seal against the drive shaft 46' as it passes through and prevent leakage of the beverage fluid from the pump 18'. The pump 18' includes a rotor 62 which is attached to the lower end of the drive shaft 46' by shrink fit, hot landing, or similar bonding methods. The use of dowels or screws is not necessary to fix the drive shaft 46' to the rotor 62 as such would increase the incidence of failure. The rotor 62 has a plurality of rollers 64 around its perimeter with it all enclosed in a pump cylinder 66, which is made from plastic or similar material with appropriate food and beverage tolerance and resistance. The assembly of the pump cylinder 66 with the rotor 62 and rollers 64 defines a working chamber 42' within the pump 18' where pressure increases operate to extract and discharge beverage fluid as appropriate. The working chamber 42' is in fluid communication with the discharge port 26a' and the top 24a' of the cavitating tube 24' when the tube assembly 16' is attached to the pump 18'.

The drive shaft 46' extends from the motor 20' and is held in place by multiple bearings 46a' and 46b'. A clip 68 is secured by set screws or similar mechanisms to the drive shaft 46', preferably between the bearings 46a', 46b'. The clip 68 functions to limit the stroke of the drive shaft 46'. An end seal 70 seals off around the drive shaft 46' at the top of the rotor 62. A housing plate 72 made of hardened materials is disposed in the pump housing 18a' adjacent to the top of the rotor 62 and rollers 64 to add durability and protect against wear. A bottom cover 74 is attached to the bottom of the pump housing 18a' and encloses the rotor 62 and rollers 64 from the bottom side. The entire pump 18' assembly is held together by screws or similar devices into the pump housing 18a'.

The uniqueness of the described second preferred embodiment is that with this arrangement, the maximum performance of the pump 18' at a given pressure per unit mass is achieved. This design of the pump 18' provides a guaranteed washout of residual material from the pump group, after the end of its operation.

Pursuant to the first preferred embodiment, when the liquid flows into the discharge tube 24 and, in turn, each of the cavitating elements 30, the liquid is exposed to the action of cavitation, wherein colloids and particles which can contain contaminants and taste altering compounds are dissolved. The contaminants are deprived of protection under chemical and physical effects of cavitation. Intense shock waves and cumulative fluid jets during collapse of cavitation bubbles cause the dispersal of colloids and particles.

At each cavitating element 30, the liquid flows around the helical plate and then into the open area between cavitating elements 30. As the liquid flows relative to the surface of the helical plate the liquid swirls. The swirling flow undergoes cavitation when it passes through the cavitating element 30 at a higher velocity than a comparable flow with streamlines parallel to the direction of flow. The high flow velocity in the cavitating element 30 causes a reduction in the flow pressure to the saturated vapor pressure and the formation of cavitation bubbles that pulsate and collapse when they enter a zone of increased pressure in the area between cavitating elements 30 or at the outlet of the discharge tube 24.

Similarly, in the second preferred embodiment, when the beverage fluid flows into the cavitating tube 24', the fluid is exposed to cavitation action at each of the cavitating elements 30'. Specifically, the helical plate elements 30a' disrupt laminar flow, i.e., generate turbulent flow and cavitation, similar to that described in connection with the first preferred embodiment. The Venturi tube elements 30b' create a sharp decrease in fluid pressure so as to further create cavitation in the fluid. The outlet from the Venturi tube elements 30b' returned to a widened flow path generally restore the fluid pressure to normal so as to reduce or eliminate cavitation in the fluid. Entry of the fluid into successive cavitating elements 30' create cavitation features again.

The collapse of cavitation bubbles produces enough energy for the dissociation of water, alcohol and other molecules followed by the generation of protons, hydroxyl ions, hydroxyl radicals, peroxide and hydrogen molecules. Gas molecules present in these bubbles are excited and affected by multiple energy and charge exchange processes. Oxygen and hydrogen molecules participate in a number of reactions, including the formation of hydroperoxyl radicals.

A study of Raman scattering spectroscopy and fluorescence spectra was performed on multiple samples of untreated and treated alcohol solutions in various concentrations ranging from 10% to 50%. Some samples were of alcohol solutions that were mixed and then subject to cavitation processing. Other samples were of alcohol solutions that were mixed after the ethanol and water components had been separately subjected to cavitation processing.

Regarding the Raman scattering spectroscopy, it became apparent that the low-frequency Raman license of ethanol molecules were insensitive to the cavitation processing. Because the primary mechanism for intermolecular bonding in water-ethanol solutions is hydrogen bonding, the most revealing portion of the vibrational spectrum is the region of stretching vibrations of OH-groups from 3000 to 3800 cm$^{-1}$. These tests revealed that the number of OH-groups with weak hydrogen bonding is greater in solutions subjected to cavitation processing than in unprocessed solutions. In addition, the ratio of integral intensities of the stretching bonds of the CH- and OH-groups in water-ethanol solutions is significantly greater for solutions mixed prior to cavitation processing than for solutions mixed after the separate components had been separately processed.

This study also revealed that at high alcohol content (about 40% by vol), clusters of ethanol molecules appear, as revealed by the emergence of the ethanol line at 400 MHz NMR. Such ethanol clusters stimulate the palate differently from either water clusters or the clathrate-like water-ethanol clusters. It is believed that trace impurities in the alcohol prior to cavitation processing influence Hydrogen-bonding, thus altering component distribution.

Following the fluorescence spectra testing, it was determined that least amount of fluorescent impurities were present in the solutions prepared from separately treated water and ethanol. Still, cavitation processing leads to a significant decrease of the content of organic impurities, fluorescing both in the UV and visible ranges, in the treated alcohol as well as in the alcohol solutions prepared from it. Cavitation treatment in two-pass systems, particularly in a high pressure hydrodynamic cavitation device, resulted in the removal of additional impurities with a fluorescence maximum of 400-450 nm. It is believed that the mechanism of action of cavitation treatment on organic impurities in aqueous alcohol solutions involves the breaking of double bonds in the carbon chain and shortening of the conjugated system, leading to a decrease in the absorption of light in the optical UV range and a decrease in fluorescence emission. Cavitation processing of ethanol significantly reduces the content of mono- and polyaromatic impurity compounds, i.e., derivatives of benzene, phenol, tyrosine, tryptophan, benzaldehyde, and others. Such reduction of impurities greatly improves the organoleptic characteristics of alcohol-based beverages.

Alcoholic beverages based on an aqueous solution of alcohol (vodka, brandy, whiskey, rum, gin and others), as well as food ethanol may contain impurities such as Acetaldehyde and/or Acetal, Benzene, Methanol, Fusel Oils, as Isobutyl, Isoamyl and active Amyl, Non Volatile Matter, Heavy Metals and others. The presence of these impurities in alcohol-containing beverages reduces their flavor and aroma qualities. Cavitation treatment of alcohol beverages and ethanol causes destruction of impurities, decreases the concentration of Acetaldehyde, Acetal, Benzene, Methanol, Fusel Oils, precipitation of salts of heavy metals, thus helping to improve the organoleptic indicators of alcohol beverages.

The inventive beverage fluid treatment system 10' of the second preferred embodiment functions in a manner similar to the first preferred embodiment. An alcoholic beverage is poured into the vessel 12 and the processing apparatus 14' is inserted into the vessel 12, with the tube assembly 16' extending toward the bottom 12b of the vessel 12. The top of the processing apparatus 14' (containing the pump 18' and motor 20') covers the open top 12a of the vessel 12 so as to enclose the beverage fluid. With a source of electrical power (not shown) supplied by wire or battery, the motor 20' activates the pump 18' so that beverage fluid is drawn from the vessel 12 into the intake tube 22'. The pump 18' then forces the beverage fluid from the intake tube 22' into the cavitation tube 24'. Cavitation occurs as described above.

Although several variations of preferred embodiments have been described in detail for purposes of illustration, various modifications may be made without departing from the scope and spirit of the invention. Accordingly, the invention is not to be limited, except as by the appended claims.

What is claimed is:

1. A system for purifying and improving the organoleptic properties of beverages, comprising:
a beverage vessel having a cylindrical, elongated body; and
a processing apparatus configured for sealed insertion into an open top of the beverage vessel, wherein the processing apparatus comprises:
a beverage pump having an inlet and an outlet;
a tube assembly, wherein the tube assembly has an extraction tube connected to the inlet and a discharge tube connected to the outlet, wherein the extraction tube and discharge tube are both configured to extend the length of the elongated body of the beverage vessel;
wherein the discharge tube comprises a cavitator device consisting of a plurality of cavitating elements disposed along a length of the discharge tube; and
a motor operatively connected to the pump.

2. The system of claim 1, wherein the processing apparatus further comprises a drive shaft fixedly engaged with a rotor in the motor and extending into the pump and fixedly engaged with a driving gear.

3. The system of claim 1, wherein the tube assembly is removably connected to the pump through selective engagement of a connection element.

4. The system of claim 3, wherein the extraction tube and the discharge tube are disposed in a concentric configuration, with the discharge tube extending from both an upper end and a lower end of the extraction tube and the connection element enclosing both an upper end of the discharge tube and the upper end of the extraction tube, further comprising a first sealing ring and a second sealing ring disposed around the connection element where the connection element connects to the pump.

5. The system of claim 1, wherein the plurality of cavitating elements each comprise a twisted plate having a width equal to a diameter of the discharge tube.

6. The system of claim 5, wherein each of the plurality of cavitating elements is secured and sealed in the discharge tube by a retaining ring disposed between the cavitating element and a wall of the discharge tube.

7. The system of claim 6, wherein the retaining ring is made from polyoxymethylene or a polyacetal copolymer material.

8. The system of claim 5, wherein each of the plurality of cavitating elements further comprise a Venturi tube element disposed immediately following each twisted plate.

9. The system of claim 8, wherein the plurality of cavitating elements is secured and sealed in the discharge tube by an upper retaining ring disposed in an upper end of the discharge tube and a lower retaining ring disposed in a lower end of the discharge tube.

10. The system of claim 9, wherein the upper retaining ring and the lower retaining ring are both made from polyoxymethylene or a polyacetal copolymer material.

* * * * *